United States Patent
Akazawa

(10) Patent No.: US 9,106,097 B2
(45) Date of Patent: Aug. 11, 2015

(54) CONNECTION DEVICE FOR CONNECTING BETWEEN ELECTRICAL DEVICES

(75) Inventor: Minoru Akazawa, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 973 days.

(21) Appl. No.: 13/241,645

(22) Filed: Sep. 23, 2011

(65) Prior Publication Data

US 2012/0080948 A1    Apr. 5, 2012

(30) Foreign Application Priority Data

Oct. 1, 2010    (JP) .................................. 2010-223806

(51) Int. Cl.
*H02J 1/00* (2006.01)
*H02J 1/10* (2006.01)
*G06F 1/26* (2006.01)

(52) U.S. Cl.
CPC .... *H02J 1/10* (2013.01); *G06F 1/26* (2013.01)

(58) Field of Classification Search
USPC .......................................................... 307/25
See application file for complete search history.

(56) References Cited

U.S. PATENT DOCUMENTS

2005/0289257 A1*  12/2005  Fink ................. 710/62
2009/0049307 A1*   2/2009  Lin ................. 713/185

FOREIGN PATENT DOCUMENTS

| JP | 02-144710 A | 6/1990 |
|----|-------------|--------|
| JP | 10-301547 A | 11/1998 |
| JP | 2000-010671 A | 1/2000 |
| JP | 2001-352670 A | 12/2001 |
| JP | 2002-094539 A | 3/2002 |
| JP | 2004-070785 A | 3/2004 |

OTHER PUBLICATIONS

Machine translation for JP2000-010671.*
Japanese Office Action issued in counterpart application No. JP2010-223806, dated Apr. 1, 2014.

* cited by examiner

*Primary Examiner* — Fritz M Fleming
(74) *Attorney, Agent, or Firm* — Rossi, Kimms & McDowell LLP

(57) ABSTRACT

A connection device for connecting between a multifunction peripheral and USB devices. A hub unit is disconnectably connected to the multifunction peripheral via a first interface for enabling power supply from the multifunction peripheral to the hub unit. The hub unit is also disconnectably connected to the USB devices via a second interface for enabling power supply from the hub unit to the USB devices. A dedicated power supply connector is connected to a power supply section of the multifunction peripheral via wiring for enabling power supply from the multifunction peripheral to the hub unit. A hub circuit relays data between the multifunction peripheral and one of the USB host connectors of the hub unit. Power from the first interface to the hub circuit is supplied through a first power path, and power from the multifunction peripheral to the USB devices is supplied through a second power path.

5 Claims, 4 Drawing Sheets

CONNECTION DEVICE FOR CONNECTING BETWEEN ELECTRICAL DEVICES

BACKGROUND OF THE INVENTION

1. Field of the Invention

The present invention relates to a connection device for connecting between electrical devices.

2. Description of the Related Art

USB is a typical serial interface for connecting between a host computer and a peripheral device. USB is established as a general-purpose serial interface standard. In general, a host computer is referred to as a USB host, and a peripheral device is referred to as a USB device.

USB devices are classified into a bus-powered type which receives power from a host computer via the VBUS of a USB port, and a self-powered type which uses its own power supplied from a commercial power source, a battery, or the like. The bus-powered USB device is advantageous in that power from a host computer is available, but the USB standard defines the upper limit of a current value to 500 mA. On the other hand, the self-powered USB device, which uses its own power supply, has some degree of freedom in available current values.

If a hub for expanding the number of USB ports of a host computer so as to enable connection of a plurality of USB devices to the host computer is configured as a general bus-powered one, the hub sometimes limits current supplied to each of the downstream USB ports to approximately 100 mA. This is because current to be supplied from the host computer to the hub is limited to 500 mA at the maximum, and hence it is impossible to allow a maximum current of 500 mA to be supplied to each of the downstream USB devices. If the supply of the maximum current is allowed, a case will occur in which the operations of the USB devices connected to the hub cannot be guaranteed.

When it is desired to allow each USB device downstream of the hub to use current up to the maximum of 500 mA, a solution is to configure the hub as a self-powered one. A general hub, if configured as a self-powered one, can be provided with a power supply separately from the power supply of a host computer, which makes it possible to configure the hub such that current is distributed to each of USB ports up to the maximum of 500 mA.

In addition to the above-described hub configurations, there has conventionally been proposed a technique of configuring a hub for both of a self-powered mode and a bus-powered mode and switching between the two modes according to the situation. For example, a hub is provided with a detection circuit for detecting a self-powered power supply, and if there is a power supply e.g. from the commercial power source, the hub supplies power via a power path of the self-powered power supply, whereas if not, the hub supplies power via a power path of a bus-powered power supply (see e.g. Japanese Patent Laid-Open Publication No. 2002-94539).

Further, there has been proposed a technique of switching between a self-powered power supply and a bus-powered power supply according to the maximum current that is to be consumed by each of USB devices connected to a hub and the bus power supply capability of a host computer (see e.g. Japanese Patent Laid-Open Publication No. 2004-70785).

These techniques enable a hub to dynamically employ an optimal power supply configuration according to its own power supply configuration and the situation of USB devices connected thereto.

On the other hand, USB has come to be used in OA devices, such as multifunction peripherals equipped with a scan function, a print function, and so forth. Some multifunction peripherals are provided with a function of outputting data read from an original document to a USB memory and reading image data stored in the USB memory to print out the same.

Further, a multifunction peripheral has connected thereto by USB an IC card-authenticating card reader for the management of the use of Office Automation (OA) devices, a keyboard for facilitating character input which is troublesome if a touch panel is used, and so forth.

When a multifunction peripheral uses a plurality of devices, such as the card reader and the keyboard, in combination, it is desirable that the multifunction peripheral itself (i.e. the main unit thereof) is provided with a plurality of USB ports. However, functions of the multifunction peripheral, which users desire to use, differ from one user to another.

Therefore, it is desirable that each user can select a configuration of the multifunction peripheral. For this reason, a multifunction peripheral is configured, for example, such that only a single USB port is provided in the main unit thereof, and a hub circuit is provided as a separate unit from the main unit such that it can be attached to the USB port afterwards as a hub unit.

The thus configured multifunction peripheral is capable of meeting the needs of users who necessitate multiple functions, without placing extra costs on users who use only limited functions.

It is desirable for users that a hub unit is configured such that each of USB ports thereof can guarantee up to 500 mA which is the upper limit defined by the USB standard, and this is also the case with a hub unit provided for a multifunction peripheral. From this viewpoint, it is desirable that the hub unit of a multifunction peripheral is configured to be self-powered.

Further, differently from a general hub, the hub unit of a multifunction peripheral is demanded to be so configured that it is supplied with power from a host computer, i.e. the main unit of the multifunction peripheral, even when the hub unit is self-powered. This is because although the hub unit of a multifunction peripheral may be supplied with power from the commercial power source, this is not preferable due to the inconvenience of connecting an AC power supply chord to the hub unit as a separate single unit and the necessity of laying out the cord.

The hub unit of a multifunction peripheral is often disposed close to the console section of the multifunction peripheral. This arrangement takes into consideration the convenience of a user who performs attaching and removing operations when a USB memory or the like is used by being connected to the multifunction peripheral.

In the case of a large-size multifunction peripheral configured in view of the above-mentioned points, if a unit as a power supply source is disposed far from the console unit of the main unit of the multifunction peripheral, a power path from the power supply source of the main unit to the hub unit becomes long.

In such a case, the electrical resistance component of wiring inevitably increases. Therefore, as the value of current flowing through the wiring increases, the amount of voltage drop increases in proportion to the length of the power path. As a consequence, a voltage drop can occur in self-powered power supply.

Even in the hub unit used in the above-described situation, it is required to prevent voltage to be supplied from being lowered to a level below the USB standard (5V±5%) even when a rated current of the hub flows, i.e. even when a maximum voltage drop that can be expected occurs.

However, when the supply voltage of the power supply source is increased in the main unit of the multifunction peripheral or when a power supply circuit is added to the hub unit, the component costs of the main unit of the multifunction peripheral or the hub unit increase, and the degree of difficulty in device design also increases. Particularly when the supply voltage of the power supply source is increased in the main unit of the multifunction peripheral, if the voltage is also for use by another component unit of the multifunction peripheral, it is required to re-examine the degrees of influence of the increase on the units, and hence a burden on device design increases. Further, when the number of wiring members is increased or low-resistance wiring members are used so as to reduce the resistance components of cables forming a power path, material costs increase, and the price of the product becomes high.

SUMMARY OF THE INVENTION

The present invention provides a connection device which effectively prevents voltage drop in a self-powered power supply, and is simplified in configuration and easy to design.

The present invention provides a connection device for connecting between a first electrical device and at least one second electrical device, comprising a first connection section disconnectably connected to the first electrical device via a first interface for performing data communication with the first electrical device and for enabling power supply from the first electrical device to the connection device, a second connection section disconnectably connected to the at least one second electrical device via a second interface for performing data communication with the at least one second electrical device and for enabling power supply from the connection device to the at least one second electrical device, a third connection section connected to a power supply section provided in the first electrical device via wiring for enabling power supply from the first electrical device to the connection device, a relay circuit configured to relay data between the first connection section and the second connection section, a first power path configured to supply power via the first interface to the relay circuit, and a second power path configured to supply power via the wiring to the second electrical device via the second interface.

According to the present invention, a connection device is provided which effectively prevents voltage drop in a self-powered power supply, and is simplified in configuration and easy to design. With this configuration, it is possible to supply, for example, a stable voltage which guarantees the compliance with the USB standard to a USB device connected to the connection device.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. In the following, a USB hub unit connectable to a multifunction peripheral will be described as a connection device according to a first embodiment of the present invention, with reference to FIGS. 1 to 3.

Figure 1:
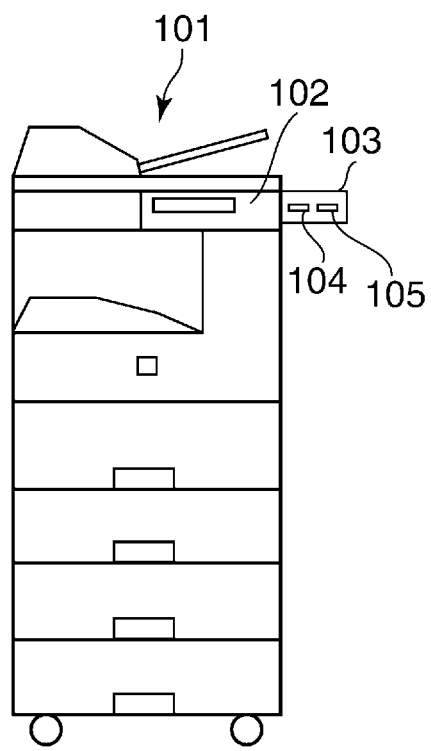
FIG. 1 is a front view of an entire multifunction peripheral incorporating a hub unit as a connection device according to a first embodiment of the present invention.

FIG. 1 is a front view of the entire multifunction peripheral incorporating the USB hub unit. A reference numeral 103 denotes the USB hub unit, and a reference numeral 101 denotes the multifunction peripheral (main unit exclusive of the USB hub unit) as a first electrical device. The hub unit 103 is disposed close to a console section 102 of the multifunction peripheral 101 in view of user convenience.

The body of the hub unit 103 is removably mounted to the main unit of the multifunction peripheral 101. The body of the hub unit 103 is mounted by a user, a service person, or the like when the user desires to increase the number of USB ports of the multifunction peripheral 101. The hub unit 103 is connected by a USB cable to a USB port, not shown, provided in the multifunction peripheral 101. Further, the hub unit 103 is connected by power supply wiring 308 to a power supply section 201 of the multifunction peripheral 101 (see FIG. 3).

With the hub unit 103 thus connected to the multifunction peripheral 101, the user can use a USB device by connecting the same to one of USB host connectors 104 and 105 provided in the hub unit 103.

Figure 2:
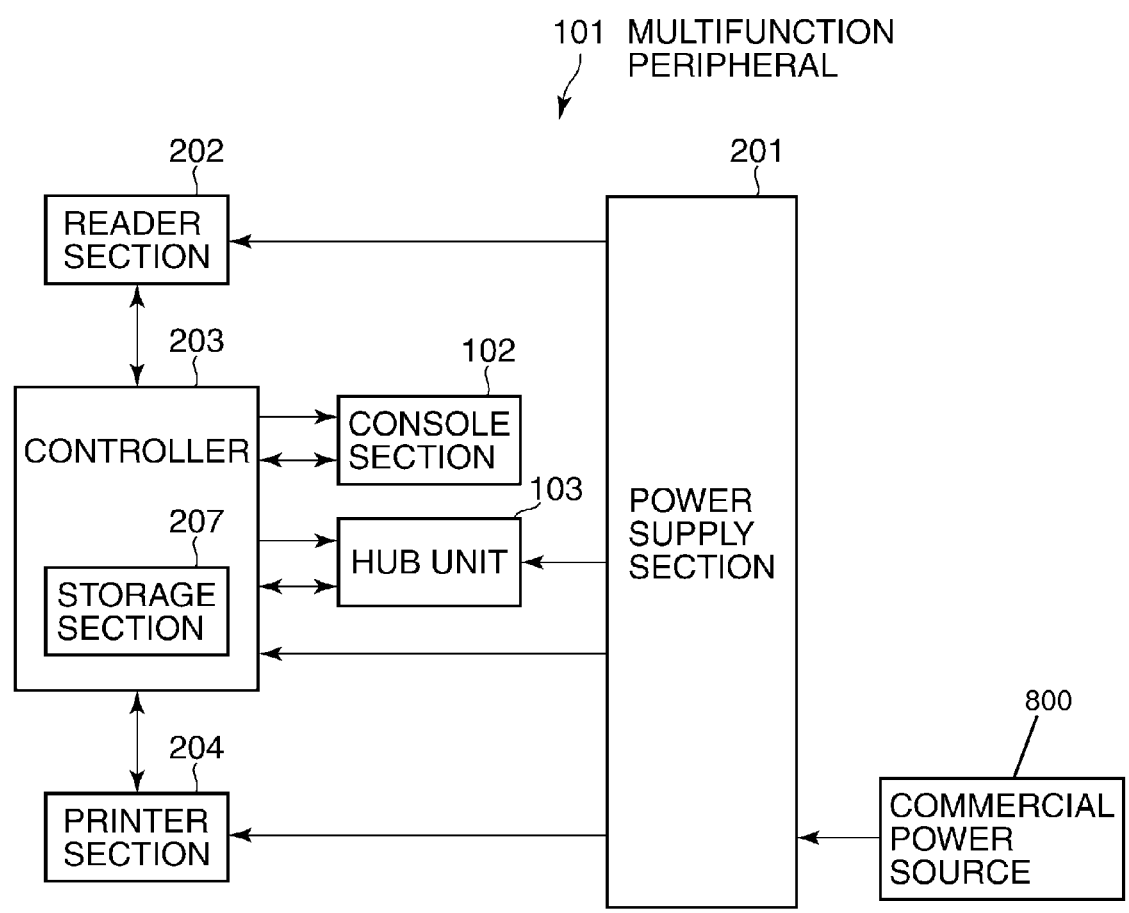
FIG. 2 is a block diagram of essential parts of the multifunction peripheral shown in FIG. 1.

Next, the power supply system of the multifunction peripheral 101 will be described with reference to FIG. 2, which is a schematic block diagram of essential parts of the multifunction peripheral 101.

Figure 3:
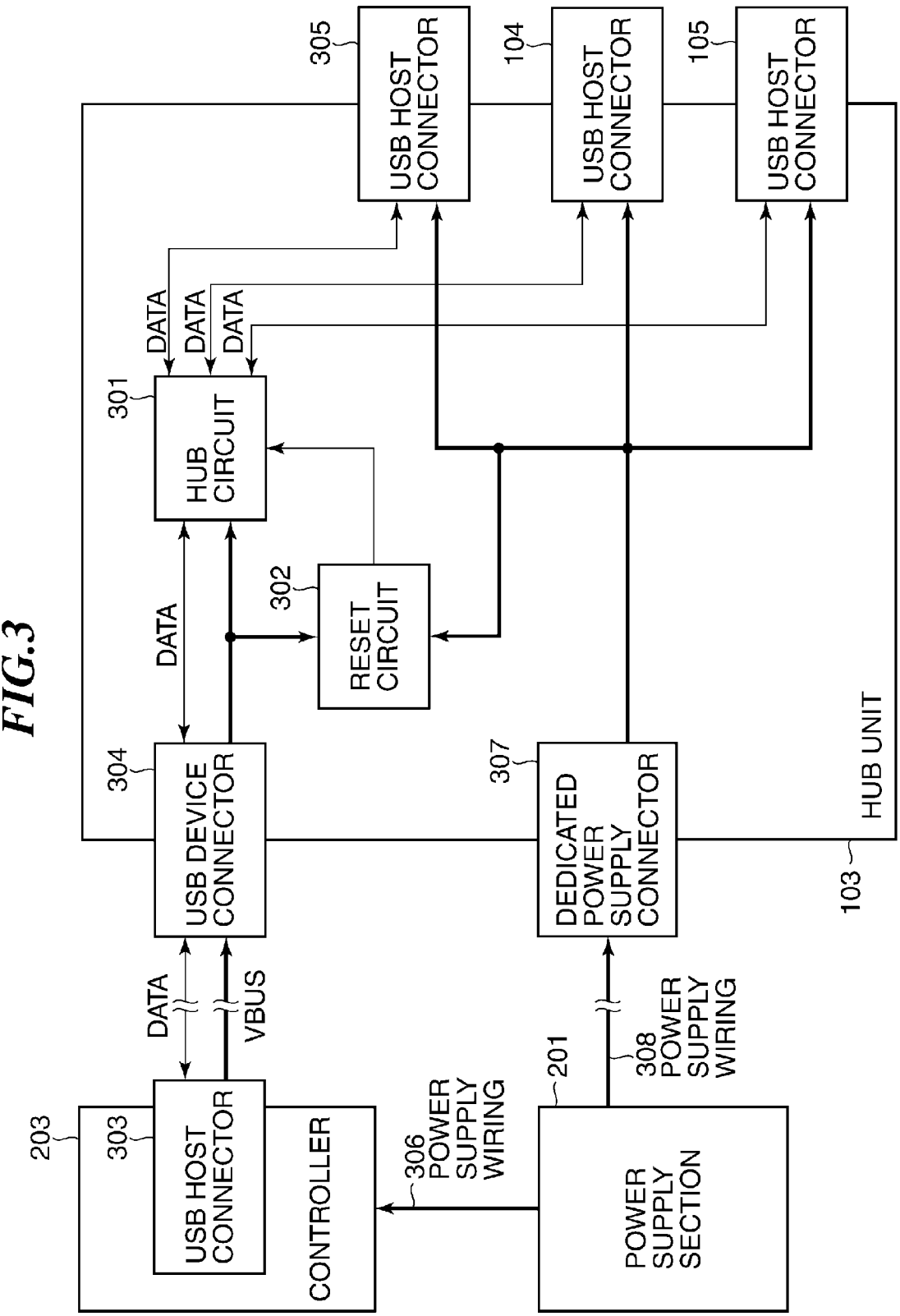
FIG. 3 is a block diagram of the hub unit as the connection device according to the first embodiment and associated parts of a main unit of the multifunction peripheral.

In the multifunction peripheral 101, the above-mentioned power supply section 201 converts alternating current supplied from a commercial power source 800 to direct current and supplies power to a reader section 202, a controller 203, a printer section 204, and the hub unit 103, through respective dedicated cables including the above-mentioned power supply wiring 308 (see also FIG. 3).

The reader section 202 of the multifunction peripheral 101 is provided with a scanner for optically reading an original document. In the multifunction peripheral 101, when the user sets an original document and operates the console section 102, the controller 203 responsive to the operation transmits a control signal to the reader section 202. Then, the reader section 202 starts reading the original document and transfers read image data to the controller 203.

Further, the controller 203 communicates with each of the reader section 202, the printer section 204, and the console section 102, to issue operation instructions to the respective sections. The controller 203 also receives image data transferred from the reader section 202, and transfers the image data to the printer section 204 or the like, after processing the image data as required.

The controller 203 is provided with a storage section 207. The controller 203 uses the storage section 207 as a work area for image processing or stores image data in the storage section 207, as required. Further, the controller 203 has a USB interface defined by the USB standard, and is configured to be capable of performing data communication with USB devices, as a USB host.

The printer section 204 of the multifunction peripheral 101 prints out image data received from the controller 203 on a print medium, such as a sheet. The console section 102 sends an operation input received from the user to the controller 203 of the multifunction peripheral 101. Further, the console section 102 is provided with a display section, not shown, and displays the status of the multifunction peripheral 101 information on which is received from the controller 203, on the display section.

The hub unit 103 of the multifunction peripheral 101 has a USB interface connectable to a USB host defined by the USB standard, and is connected to the controller 203 via a USB cable. Further, the hub unit 103 has a plurality of USB interfaces connectable to USB devices defined by the USB standard whereby USB devices can be externally connected thereto. The controller 203 can perform data communication with the USB devices externally connected thereto via the hub unit 103.

Next, a description will be given of the power supply system of the USB hub unit 103 incorporated in the multifunction peripheral 101, with reference to FIG. 3, which is a block diagram showing the connection relationship between the power supply section 201 and the controller 203.

The hub unit 103 has a relay circuit (hereinafter referred to as "the hub circuit") 301 provided with a hub function. The hub circuit 301 is connected, via a USB device connector 304, to a USB host connector 303 of the controller 203 as a USB host by a USB cable. In short, the USB host connector 303 and the USB device connector 304 are connected therebetween by a first interface.

With this arrangement, the hub circuit 301 is disconnectably connected to the USB host connector 303 of the controller 203, which is provided, as a serial interface adapted to the bus power for power supply, in the multifunction peripheral 101 as an electrical device. The USB device connector 304 functions as a first connection section connected to the USB host connector 303 via the serial interface.

Further, the hub circuit 301 is disconnectably connected to a group of USB devices, not shown, via the above-mentioned USB host connectors 104 and 105 and a USB host connector 305. The USB devices as second electrical devices include a USB memory in which image data can be written and from which the same can be read, an IC card-authenticating card reader, a keyboard, etc. for example. The USB host connectors 104, 105, and 305 function as a second connection section for connection to the USB devices as second electrical devices.

When a USB device is connected to one of the USB host connectors 104, 105, and 305, the controller 203 starts data communication via the hub circuit 301.

More specifically, the hub unit 103 is disconnectably connected to the multifunction peripheral 101 via the USB host connector 303 and USB device connector 304, and a dedicated power supply connector 307. The dedicated power supply connector 307 functions as a third connection section.

The USB host connectors 104, 105, and 305 are serial interfaces adapted to the bus power for power supply, and function as the second connection section as mentioned above. Further, the USB host connectors 104, 105, and 305 function as a second interface as well.

USB devices are disconnectably connected to one of the USB host connectors 104, 105, and 305, respectively. The dedicated power supply connector 307 functions as a third connection section that is connected to the power supply section 201 of the multifunction peripheral 101 via the aforementioned power supply wiring 308.

The hub circuit 301 that relays data communication is stably supplied with power from the controller 203 via the USB host connector 303 and the USB device connector 304.

On the other hand, a USB device which is USB-connected to the hub unit 103 is supplied with power directly (without via the USB host connector 303 and the USB device connector 304) from the power supply section 201 via the power supply wiring 308 and the dedicated power supply connector 307. This means that the power supply wiring 308 functions as wiring that enables the supply of power from the first electrical device to the connection device.

In short, the power supply system of the hub unit 103 incorporated in the multifunction peripheral of the present embodiment includes two power paths for supplying power to the hub unit 103.

The first power path extends from the power supply section 201 through power supply wiring 306, the USB host connector 303 of the controller 203, and the USB cable, to the USB device connector 304 of the hub unit 103. The power supply section 201 supplies power to the hub circuit 301 through the first power path.

The second power path extends from the power supply section 201 through the power supply wiring 308 to the dedicated power supply connector 307 of the hub unit 103. Using the second power path, the power supply section 201 can supply power to a group of USB devices connected to the hub unit 103 via the USB host connectors 104, 105, and 305.

The reason why the power supply system of the hub unit 103 incorporated in the multifunction peripheral of the present embodiment has its power path divided into two separate paths as described above is as follows:

First, self-powered power supply to a USB device connected to the hub unit 103 is required to be performed such that the supplied power (upper limit 500 mA, 5V±5%) defined by the USB standard is guaranteed. However, if the hub unit 103 and the power supply section 201 are physically distant from each other, the length of the power supply wiring 308 inevitably becomes long. The conductor resistance of the power supply wiring 308 increases in proportion to the length thereof, and therefore the resistance component of a corresponding circuitry of the power supply system increases with an increase in the length of the power supply wiring 308. For this reason, when the power supply wiring 308 is long, the voltage drop becomes larger as the current flowing therethrough is larger. Therefore, when the power supply wiring 308 is long, the supply of extra current therethrough should be avoided to the utmost so as to guarantee the supplied power specified by the USB standard.

On the other hand, the power path between the controller 203 and the hub unit 103 is so designed that the upper limit 500 mA, 5V±5% specified by the USB standard can be reliably guaranteed.

Further, in the power supply system of the hub unit 103 incorporated in the multifunction peripheral, the voltage drop in the power supply wiring 308 is minimized by dividing current load between the power path through the power supply wiring 308 and the power path between the controller 203 and the hub unit 103 by way of the power wiring 306.

To this end, current for the hub circuit 301 is supplied through the first power path, and current for exclusive supply to USB devices is supplied through the second power path. More specifically, the first power path (i.e. the power supply section 201, the power supply wiring 306, the USB host connector 303 of the controller 203, the USB cable, and the USB device connector 304 of the hub unit 103) is made responsible for the supply of current to the hub circuit 301.

On the other hand, the second power path (i.e. the power supply section 201, the power supply wiring 308, and the dedicated power supply connector 307 of the hub unit 103) is made responsible for the supply of current exclusively supplied to USB devices.

Note that as a method of power supply to a hub unit incorporated in a multifunction peripheral, it is envisaged to switch the power path to the first power path when a USB device having a low rated current value is detected. This method makes it possible to dynamically reduce load on the second power path to thereby ensure stable voltage.

However, this method requires the hub unit 103 to be provided with a circuit for switching between the power paths, which causes an increase in the number of components and manufacturing costs. In this method, in order to perform control for switching between the power paths, the hub circuit 301 is required to be provided with a circuit for generating a control signal for power path switching, or to be supplied with a dedicated control signal from the controller 203. Therefore, when the method is employed, hardware has to be changed in many respects, and hence load on device design increases.

Compared with the above method, according to the power supply system of the hub unit 103 incorporated in the multifunction peripheral of the present embodiment, the circuit for switching between the first power path and the second power path can be dispensed with. This makes it possible to easily design the multifunction peripheral 101 and the hub unit 103 at low costs.

Further, the hub unit 103 is also provided with a reset circuit 302 for monitoring voltages in the respective first and second power paths and resetting the hub circuit 301 when one of the voltages is not higher than a predetermined value. That is, this reset circuit 302 generates a reset signal and sends the same to the hub circuit 301.

The hub unit 103 can prevent an operation failure thereof by monitoring the voltages in the two power paths. More specifically, the hub unit 103 can reset the hub circuit 301 in synchronism with an operation of a reset circuit, not shown, of the controller 203 by monitoring the voltage in the first power path. Further, by monitoring the voltage in the second power path, when a communication with a USB device connected to the hub unit 103 is interrupted due to an unexpected voltage drop or the like, the hub circuit 301 can be reset to thereby recover the communication.

Next, a description will be given, with reference to FIG. 4, of a multifunction peripheral incorporating a USB hub unit as a connection device according to a second embodiment of the present invention.

The second embodiment is configured such that a keyboard 401 is connected to the USB host connector 305 and power is supplied to the keyboard 401 through the first power path, and in this respect, the second embodiment is distinguished from the first embodiment of which the arrangement of essential parts thereof is described with reference to FIG. 3.

In the second embodiment, the hub unit 103 is connected to the multifunction peripheral 101, with a USB device connected to the hub unit 103. In the second embodiment, the keyboard 401 is provided as the USB device as shown in FIG. 4.

In such a case, the USB interface is sometimes configured to be closed against a user e.g. by covering the USB host connector 305 with a mold member so as to prevent easy insertion or extraction of the keyboard 401. In short, the USB host connector 305 is used as a dedicated port for the keyboard 401. In this case, since the value of a maximum current to be consumed by the USB host connector 305 can be naturally determined in advance, it is possible to divide current load supplied to the hub unit 103 between the first power path and the second power path, similarly to the above-described first embodiment.

Figure 4:
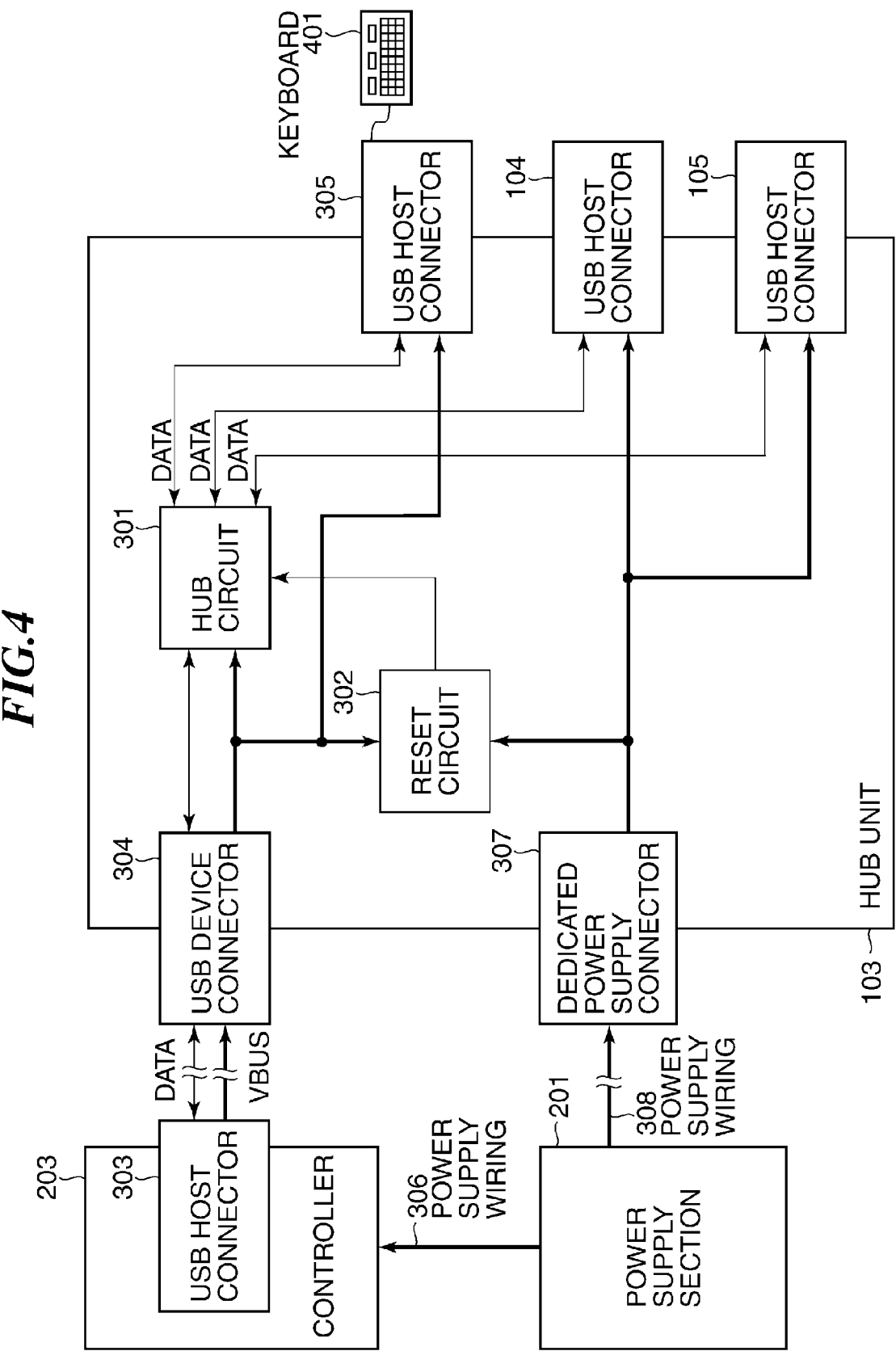
FIG. 4 is a block diagram of a hub unit as a connection device according to a second embodiment and associated parts of a main unit of a multifunction peripheral.

For example, assuming that the maximum consumption current of the hub circuit 301 is 300 mA and the maximum consumption current of the keyboard 401 is 200 mA or less, the hub unit 103 can be configured, as shown in FIG. 4, such that the USB host connector 305 is supplied with power through the first power path. When the hub unit 103 is thus configured, it is possible to further reduce the maximum consumption current that flows through the second power path, to thereby facilitate supply of stable voltage that guarantees the USB standard.

In short, according to the second embodiment, power is supplied to the hub circuit 301 and the keyboard 401 in a power range within an allowable limit of bus power provided by the controller 203 of the multifunction peripheral 101 as an electrical device. In this case, power is supplied, to the keyboard 401 as a device which is known in advance to demand power in an amount available even when added together with an amount of power to be consumed by the hub circuit 301, in a range of power amount determined by subtracting the amount of power to be consumed by the hub circuit 301 from the upper limit of bus power provided by the controller 203.

Note that the other configuration, operations, and advantageous effects than those described above are the same as those of the above-described first embodiment, and therefore description thereof is omitted.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2010-223806 filed Oct. 1, 2010, which is hereby incorporated by reference herein in its entirety.

What is claimed is:

1. A connection device for connecting between a first electrical device and at least one second electrical device, comprising:
    a first connection section connected to the first electrical device via a first interface for performing data communication with the first electrical device and for enabling power supply from the first electrical device to the connection device;
    a second connection section disconnectably connected to the at least one second electrical device via a second interface for performing data communication with the at least one second electrical device and for enabling power supply from the connection device to the at least one second electrical device;
    a third connection section connected to the first electrical device via wiring for enabling power supply generated by a power supply section provided in the first electrical device to the connection device;
    a relay circuit configured to relay data between said first connection section and said second connection section;
    a first power path configured to supply power via the first interface to said relay circuit; and
    a second power path configured to supply power via the wiring to the second electrical device via the second interface,
    wherein the power via the first interface is not supplied to the second electrical device via the second interface.

2. The connection device according to claim 1, wherein the at least one second electrical device comprises a plurality of second electrical devices, and the power via the first interface is not supplied to any one of the plurality of second electrical devices.

3. The connection device according to claim 1, comprising a reset circuit configured to monitor a voltage in the first power path and a voltage in the second power path, and generate a reset signal for resetting said relay circuit when at least one of the voltages falls below a predetermined voltage.

4. The connection device according to claim 1, wherein each of the first interface and the second interface comprises a USB cable.

5. A printing apparatus comprising:
- the connection device as claimed in claim 1;
- a control section connected to the first connection section of the connection device; and
- a printing section controlled by the control section.

* * * * *